United States Patent [19]

Ciuba et al.

[11] Patent Number: 4,749,412

[45] Date of Patent: * Jun. 7, 1988

[54] METHOD AND COMPOSITION FOR THE INHIBITION OF CORROSION

[75] Inventors: Stanley J. Ciuba, Burnsville; Michael J. Bartelme, III, Richfield, both of Minn.

[73] Assignee: Drew Chemical Corporation, Boonton, N.J.

[ * ] Notice: The portion of the term of this patent subsequent to Jan. 22, 2002 has been disclaimed.

[21] Appl. No.: 31,253

[22] Filed: Mar. 26, 1987

Related U.S. Application Data

[62] Division of Ser. No. 781,267, Sep. 27, 1985, Pat. No. 4,675,215.

[51] Int. Cl.$^4$ ............................ C04B 9/02; C04B 9/06; C11D 7/34
[52] U.S. Cl. ................................ 106/14.23; 106/14.25; 106/14.27; 106/14.28; 106/14.29; 106/14.38; 252/389.52; 252/389.53; 252/395
[58] Field of Search ............... 106/14.23, 14.25, 14.27, 106/14.28, 14.29, 14.38; 252/395, 389.53, 389.52

[56] References Cited

U.S. PATENT DOCUMENTS

| | | | |
|---|---|---|---|
| 441,291 | 11/1890 | Dejonge | 106/14.33 |
| 1,630,101 | 5/1927 | Wilkin | 428/467 |
| 2,128,523 | 8/1938 | Burwell | 134/1 |
| 2,242,837 | 5/1941 | Shields | 260/29 |
| 2,348,715 | 5/1944 | Adams | 106/14 |
| 2,374,565 | 4/1945 | Roden | 106/14 |
| 2,421,672 | 6/1947 | Wilson et al. | 106/14 |
| 2,453,833 | 11/1948 | Davis et al. | 260/23 |
| 2,485,150 | 10/1949 | Glavis et al. | 252/33.4 |
| 2,648,643 | 8/1955 | Adams et al. | 260/23 |
| 2,758,981 | 8/1956 | Cooke et al. | 260/23 |
| 2,779,784 | 1/1957 | Sharrah | 260/505 |
| 2,796,353 | 6/1957 | Dieman et al. | 106/14 |
| 3,033,808 | 5/1962 | Murray et al. | 260/23 |
| 3,035,926 | 5/1962 | Larrieu | 106/14 |
| 3,137,583 | 6/1964 | Bryan et al. | 106/14 |
| 3,260,609 | 7/1966 | Reeser | 106/263 |
| 3,453,124 | 7/1969 | Wurstner | 106/14.26 |
| 3,565,843 | 2/1971 | Kassinger et al. | 260/28.5 |
| 3,661,622 | 5/1972 | Rogers | 117/75 |
| 3,746,643 | 7/1973 | Rogers | 252/33 |
| 3,925,087 | 12/1975 | Lechner | 106/14.25 |
| 3,948,976 | 4/1976 | Suen et al. | 260/484 |
| 4,004,951 | 1/1977 | Dorsey, Jr. | 148/6.27 |
| 4,150,192 | 4/1979 | Downey | 428/462 |
| 4,495,225 | 1/1985 | Ciuba | 427/236 |
| 4,631,083 | 12/1986 | Christhilf | 106/14.23 |

FOREIGN PATENT DOCUMENTS 2330375 1/1974 Fed. Rep. of Germany .
1575431 9/1980 United Kingdom .

*Primary Examiner*—Dennis Albrecht
*Assistant Examiner*—Kathleen Markowski
*Attorney, Agent, or Firm*—Merchant, Gould, Smith, Edell, Welter & Schmidt

[57] ABSTRACT

A method and composition for inhibiting corrosion is disclosed. The method involves forming a coating of from about 1-10 mils thick on a surface, with a composition comprising an over-based alkaline organic sulfonate salt, a drying oil, a copper or rare earth metal drier, a zinc metal drier, an organic solvent, and petrolatum, and curing the coating. Optionally, the composition may include polyisobutylene. The method and composition are particularly useful for metal surfaces in a seawater environment.

12 Claims, No Drawings

METHOD AND COMPOSITION FOR THE INHIBITION OF CORROSION

This is a division, of application Ser. No. 781,267, filed Sept. 27, 1985, now U.S. Pat. No. 4,675,215.

TECHNICAL FIELD

This invention relates to a method and composition for coating metal surfaces such as carbon steel surfaces to protect them from the formation of rust or other corrosion. The composition of the present invention includes an overbased calcium sulfonate, a drying oil, an organic solvent, petrolatum, polyisobutylene, and two metal driers. When applied to a metal surface, the composition of the invention will provide a coating of up to 10 mils in thickness per each spray application. The coating provides excellent adhesion, exceptional coating thickness, and long term stability and corrosion protection in a seawater environment.

BACKGROUND OF THE INVENTION

Corrosion of metals can be a significant problem where metal surfaces are exposed to water, air, inorganic metal salts, and the like. One very significant source of corrosion is a seawater environment, that is, seawater itself, seawater mist or spray, or the salty air which can exist near bodies of seawater. A seawater environment can attack and corrode ferrous and non-ferrous metals. A variety of equipment is subject to corrosion by seawater, including piping, dry-docks, steel cables, superstructures of and equipment on off-shore drilling and production rigs, desalination plants, seawater mineral extracting plants, surfaces of ships and barges, and tanks subjected to seawater environment.

Many corrosion preventive compositions are known. One is disclosed in U.S. Pat. No. 3,925,087 issued Dec. 9, 1975, to Lechner et al. The composition disclosed in U.S. Pat. No. 3,925,087 generally provides a coating of no greater than 3 mils, or more typically, 1 to 2 mils. In general, a thicker coating will last longer and provide better corrosion resistance than a thinner coating of an equally effective substance. However, when applied in a thicker layer, this type of coating requires an inconveniently long period of time to cure. In addition, a thicker layer tends to flow, and a coating thickness of greater than about 3 or 4 mils generally cannot be maintained. Further, while the compositions of Lechner can inhibit corrosion for an adequate period of time, longer-lasting corrosion protection is highly desirable.

Accordingly, a need exists for a corrosion or rust preventive coating composition which will maintain a coating thickness of greater than 3 mils, which will cure rapidly and which will exhibit exceptionally effective and long lasting corrosion prevention.

BRIEF DESCRIPTION OF THE INVENTION

We have discovered a rust preventive composition which when applied to a metal surface can maintain a coating thickness of up to 10 mils, but is also exceptionally effective at lower coating thicknesses such as 1-3 mils. The composition exhibits exceptional and long lasting corrosion resistance, cures quickly to a solid or hard durable coating, exhibits little, if any, sagging or running during application, and adheres exceptionally well to metal surfaces. The coating will generally withstand hot water or turbulence. It is useful for marine and off-shore drilling applications, including desalination plants, seawater mineral extract plants, the bottom section of a jack-up rig, seawater cooling circuits, portuary installations, metal equipment, pipes, and the like.

The present invention is a method and composition for coating ferrous or non-ferrous metal surfaces to protect them from corrosion. The composition of the present invention includes about 5 to 80 percent by weight of a rust-inhibitive, grease-like concentrate. The concentrate comprises a thixotropic inorganic/organic complex stably dispersed in an essentially inert liquid or oily phase, in an amount not to exceed 4 parts, per part of the complex, of the essentially inert liquid oily phase. The inorganic/organic complex comprises an overbased alkaline earth organic sulfonate salt. The inorganic alkaline earth component has a crystalline structure which is platelet and film-forming in character.

The composition further includes about 1 to 25 percent by weight of a drying oil. The drying oil is characterized in that it is miscible in a diluent oil selected from the group consisting of aliphatic hydrocarbon diluents, cycloaliphatic hydrocarbon diluents, aromatic hydrocarbon diluents and mixtures thereof, boiling at temperatures above 150° C.

The invention further comprises about 0.03 to 0.6 percent by weight metal of a first metal drier selected from the group consisting of copper carboxylate compounds and rare earth carboxylate compounds, and mixtures thereof. A second metal drier is also provided, at about 0.1 to 2.2 percent by weight metal to the weight of the total composition. The second metal drier is selected from zinc carboxylate compounds and mixtures thereof. Where the first metal drier is a copper carboxylate compound, optionally, the composition could include a rare earth carboxylate compound as a third metal drier.

In addition, the composition comprises about 10 to 90 percent by weight of organic solvents of the type useful with oil-based paints and coatings, and about 2 to 15 percent by weight petrolatum.

In the method of this invention, a coating of from about 1 to 10 mils thick of the above-described composition is formed on a surface requiring protection from corrosion. After formation of the coating, the coating is cured to provide the desired corrosion-preventive characteristics. If desired, a coating can be formed of several 1–10 mil coatings which are applied and cured successively.

The coating formed of the composition of this invention cures to a solid, hard non-tacky protective layer. The coating can penetrate a porous surface, or spread under existing corrosion corrosion-inhibiting coatings, and has little or no tendency to crack, flake, or peel.

DETAILED DESCRIPTION OF THE INVENTION

A major component of the composition of the present invention is the inorganic-organic complex. The preferred complexes can be characterized as over-neutralized salts of organic sulphonic acids. These over-neutralized or "overbased" salts can be characterized by the following structural formula:

$$(RSO_3)_m M \cdot aM_x X_m$$

wherein
R represents an alkyl-aryl group, e.g.
$C_{18-36}H_{37-73}PH$—(wherein—PH—represents phenylene);

M represents a metal of valence m;

m represents the valence of M and is preferably an integer ranging from 1 to 4, more typically 1 or 2;

X represents a basic anion having a valence of x;

x represents the valence of X and typically an integer ranging from 1 to 3; and a represents the excess over stoichiometry, in equivalents, for the basic salt $M_xX_m$.

Accordingly, a is greater than 0 and preferably greater than 1. As is shown by U.S. Pat. No. 3,453,124 (Wurstner) values for a of 3 or 4 are not unusual and values of about 8 or more are permissible.

The inorganic-organic complexes are available in grease-like concentrates wherein the inorganic-organic complex has been stably dispersed in an inert oily diluent. The amount of inorganic-organic complex in these concentrates is said to amount to at least 25% by weight and more typically 40–70% by weight. Accordingly, the amount of oily diluent is typically about 50 parts per 100 by weight, based on the weight of the complex. A diluted concentrate containing, for example, 70% hydrocarbon oil can be used without substantial modification in this invention.

The preferred rust-preventive concentrate consists essentially of a grease-like dispersion of the inorganic-organic complex in oil and has the following physical and chemical properties:

Specific gravity at 60° F.: 1.006 g./c.c.

Brookfield viscosity (No. 6 spindle at 10 rpm, 77° F.): 110,000–150,000 centipoise.

Flash point, COC 375° F.

Melting point: 550° F.

"Non-volatiles" (Federal Standard 141A Method 4041.1): 96 wt.%, minimum.

Sulfated ash, ASTM Test D-874: 24.5%

This product, commercially designated as SACI 200 A (trademark) is polar and thioxtropic. It is available from Witco Chemical Corporation, New York. It is compatible with aromatic, aliphatic, or chlorinated hydrocarbons commonly used as diluents. The amount of inorganic-organic complex dispersed in the oil is around 40% by weight, and the complex is the calcium sulfonate/calcium carbonate type having the formula $(RSO_3)_2Ca \cdot aCaCO_3$, wherein R and a have the significance indicated previously. Although the SACI 200 A product is recommended for use in interior protective coatings, it is preferred for outdoor use in the context of this invention.

In the preferred embodiments of this invention, the amount of concentrate is at least about 5% by weight and not more than about 80% by weight. Preferably, for improved corrosion resistance, adhesion, coating thickness, and curing, the concentrate is present in the composition at a concentration of about 20–40% by weight.

The SACI 200 A product appears to be among the most effective concentrates which can be used in the context of this invention. While not wishing to be limited to any theory, we theorize that the particular crystal structure of the calcium carbonate contained therein contributes to the beneficial results obtained where SACI 200 A product is used in the method and composition of this invention.

DRYING OILS

A drying oil or oils will comprise about 1–25% by weight of the total composition of this invention. A main characteristic of drying oils is a high content of unsaturated fatty acids. The preferred drying oil in the context of this invention is tung oil, also known as eleosteric acid. Tung oil is preferred for reasons of effectiveness in providing corrosion-resistance of the total composition. Another highly suitable drying oil for the purposes of this invention is oiticica oil. Adequate results have also been obtained with other drying oils such as linseed oil. Other suitable drying oils will no doubt occur to those skilled in the art.

We have discovered that a concentration of approximately 10–20% by weight tung oil, in combination with the various other components of this invention, generally provides the most desirable viscosity, curing, and corrosion resistance.

Generally, the amount of drying oil should not exceed the amount of inorganic/organic complex, to avoid brittleness in the cured coating. The ratio of inorganic/organic complex to drying oil can range up to about 10:1 and higher. For reasons of improved curing and prolonged corrosion resistance, a preferred ratio falls within the range of about 2:1 to 3:1.

ORGANIC SOLVENT

An organic solvent is utilized in this invention in a concentration of about 10–90% or, preferably, about 30–60% by weight of the total composition.

The amount of solvent used will affect coating thickness and rate of curing. In general terms, the composition of this invention cures primarily by solvent evaporation. Generally, any organic solvent such as those known to be useful in oil-based paints and coatings, which will dissolve the other components of the invention and evaporate under ambient conditions, will be suitable. Such solvents include aliphatic and aromatic hydrocarbons, aliphatic naphthas, ketones (such as acetone, diethyl ketone, ethyl butyl ketone, and methyl isoamyl ketone), alcohols, glycols (such as ethylene glycolmethyl ether, di-ethylene glycol n-butyl ether, and propylene glycol phenylether), esters (such as alkyl acetates and formates), and chlorinated solvents (such as ethylene dichloride, monochlorobenzene, and perchloroethylene), which exhibit a boiling point below 500° F. at 760 mm Hg.

A currently preferred organic solvent for use in this invention is generally known as mineral spirits, available from a variety of chemical suppliers. Generally, for use in this invention, the mineral spirits will have a specific gravity at 60° F. of about 0.755–0.790, a flash point of at least about 100° F., an initial boiling point (IPB) of at least about 300° F., and a dry point no greater than about 400° F., and will comprise no greater than around 8% aromatics. One product meeting these specifications is the AMSCO Mineral Spirits 75, available from Union Chemicals, having an API of 52.0, a specific gravity of 0.771, and a pounds per gallon of 6.42 (all at 60° F., 15.56° C.), an initial boiling point of 319° F. (159.4° C.), a 50% costillation at 345° F. (173.9° C.), a dry point of 397° F. (202.8° C.), and a vapor pressure of 2.6 mm Hg. at 20° C. This product comprises about 7% aromatics, 48% paraffins, and 45% naphthenes.

OXIDIZED PETROLATUM

The composition of the invention further comprises about 2–15%, or preferably, about 3–8%, petrolatum or oxidized petrolatum. The petrolatum enhances the uniformity of the filming or coating formation, and prevents streaking of the coating.

A preferred petroleum composition is the Alox 600 product available from the Alox Corporation. This product is a mixture of relatively high molecular weight organic acids, lactones and esters derived from petroleum. Chemical and physical properties of this product include a typical acid number (ASTM-D-9-74) of from about 45–60, a saponification number (ASTM-D-94) of about 100–140, a specific gravity at 75° F. (24° C.) of around 0.95, an average weight per gallon at 75° F. of around 7.9 lbs., a minimum melting point of approximately 115° F. (46° C.), a minimum flash point of around 345° F. (174° C.) and a maximum ash content (ASTM D-48-2) of around 0.2%. It is believed that other similar relatively high molecular weight materials having some organic acid functionality would also be suitable for the purposes of this invention.

METAL DRIERS

The composition of this invention will include two metal driers. The first will be selected from the group consisting of copper carboxylate compounds and rare earth carboxylate compounds, and mixtures thereof. For reasons of better curing and improved corrosion resistance, copper carboxylate compounds are preferred.

If a copper metal drier is used, preferably it should be provided such that the copper metal content of the rust preventive coating composition is about 0.06 to 0.6 percent by weight. Most preferably, the copper metal content of the coating composition will be about 0.1 to 0.6 percent by weight.

A preferred copper metal drier is the CEM-ALL ® drier available from Mooney Chemicals, Inc. of Cleveland, Ohio. The CEM-ALL ® copper metal drier includes copper carboxylates produced from a blend of synthetic domestic acids. One of the CEM-ALL ® driers contains a concentration of about 12% by weight copper. Generally, the CEM-ALL ® copper carboxylates comprise neodecanoates and/or 2-ethyl-hexoates. Typical characteristics of the 12% copper carboxylate CEM-ALL ® drier is a volatility of about 30%, a Gardner viscosity at 25° C. of J, a specific gravity at 25/25° C. of about 1.025, and a density of about 8.54 pounds per gallon.

Where the 12% copper CEM-ALL ® compound is used, the compound should comprise about 0.5 to 5.0 percent by weight of the rust preventive coating composition. Most preferably, it should comprise about 1.0 to 5.0 percent by weight of the composition.

A preferred rare earth metal drier is the 6% rare earth TEN-CEM ® drier available from Mooney Chemicals, Inc., a carboxylate produced from domestic neodeanoate acid. This drier generally comprises lanthanum and cerium carboxylate compounds. Typical characteristics of this drier include a volatility of about 70%, a Gardner viscosity at 25° C., of A-5, a specific gravity at 25/25° C. of about 0.880, and a density of about 7.33 pounds per gallon.

Another preferred rare earth metal drier is the 12% rare earth HEX-CEM drier available from Mooney Chemicals, Inc. The HEX-CEM drier is an octoate, produced from 2-ethylhexanoic acid. Typical characteristics of this drier include a volatility of about 41%, a Garner viscosity, at 25° C., of A, a specific gravity at 25/25° C. of about 0.989, and a density of about 8.24 pounds per gallon.

If a rare earth drier is used as the first metal drier, the rare earth metal content of the rust preventive coating composition will preferably be about 0.03 to 0.6 percent by weiht, or, most preferably, about 0.03 to 0.3 percent by weight. To achieve this, for example, the 6% rare earth TEN-CEM ® compound should be provided to comprise about 0.5 to 10.0, or, more preferably, 0.5 to 5.0 weight-percent of the rust preventive coating composition.

Lead driers can also be suitable in place of the copper or the rare earth driers, but because of the toxicity of lead, lead driers are far less desirable. It is also envisioned that a manganese carboxylate drier may be suitable as the first metal drier. If used, the manganese carboxylate drier should be provided in an amount such that the manganese metal content of the rust preventive coating composition is about 0.06 to 0.6 percent by weight.

The second metal drier is selected from the group consisting of zinc carboxylate compounds.

An example of preferred zinc driers is the zinc HEX-CEM ® driers available from Mooney Chemicals, Inc. The HEX-CEM ® zinc driers are produced from 2-ethylhexanoic acid, a synthetic organic acid. The driers are characterized as octoates. The 22% zinc HEX-CEM drier has a zinc content of about 22% by weight, an NVM (non-volatile material) value of about 99%, and a volatility of about 1%. It has a Gardner viscosity at 25° C. of Y, a specific gravity at 25/25° C. of about 1.181, and a density of about 9.84 pounds per gallon.

Other suitable zinc driers include the zinc CEM-ALL ® driers from Mooney Chemicals. These driers are produced from a blend of synthetic domestic acids. The 8% zinc CEM-ALL ® drier typically has an NVM value of about 37%, a volatility of about 63%, a Gardner viscosity at 25° C. of A-5, a specific gravity (25/25° C.) of about 0.886, and lbs./gal. of about 7.38. The 16% zinc CEM-ALL ® drier typically has an NVM value of about 73%, a volatility of about 27%, a Gardner viscosity at 25° C. of A-I, a specific gravity (25/25° C.) of about 1.040, and lbs./gal. of about 8.66.

The NAP-ALL ® zinc driers, also available through Mooney Chemicals, are also suitable for use in this invention. These driers are produced from highly refined naphthenic acid and comprise naphthenates. Those currently available include an 8% zinc drier and a 10% zinc drier.

The zinc metal drier should be provided in an amount sufficient to provide a zinc metal content of about 0.1 to 2.2 percent by weight of the total coating composition. Preferably, for reasons of improved curing and coating thickness, the zinc metal drier will be provided in an amount sufficient to provide a zinc content of about 0.2 to 1.1 percent by weight of the total composition. Thus, for example, where the 22% zinc HEX-CEM ® drier is used, it should comprise about 0.5 to 10 percent, or preferably, about 1.0 to 5.0 percent by weight of the total coating composition.

A preferred embodiment of the coating composition of this invention comprises a copper metal drier and a zinc metal drier. Effective results can also be obtained utilizing a third metal drier comprising a rare earth carboxylate compound. The rare earth metals of this compound should comprise about 0.06 to 0.3 percent by weight of the coating composition of this invention.

Suitable rare earth carboxylate compounds include the rare earth HEX CEM ® driers and the rare earth TEN-CEM ® driers, both described previously. Other suitable rare earth carboxylate compounds can, of course, be used. Where the 6% rare earth TEN-CEM ® drier is used as the third metal drier, to provide the desired metal content, it should comprise from about 1.0 to 5.0 percent by weight of the total coating composition.

POLYISOBUTYLENE

Polyisobutylene is provided in a concentration of about 0–5% by weight of the total composition, or preferably, about 0.5–3% by weight. While polyisobutylene is not required in the context of this invention, it is believed to improve adhesion such that the composition will better cling to the metal surface. It also provides internal adhesion, which aids in maintaining a relatively thick coating.

We have found that for coating compositions to be applied or cured at higher temperatures, for example, in the warmer climates, it is advisable to reduce or eliminate the polyisobutylene to obtain the desired curing.

Polyisobutylene can be obtained from many chemical suppliers such as Amoco Chemical Corporation or Chevron Chemical Corporation. A suitable polyisobutylene composition will generally have a specific gravity at 60° F. of about 0.817–0.880, and a minimum flash point of about 365° F.

OTHER COMPONENTS

The coating composition of this invention may also comprise additional components such as viscosity modifiers, pigments, or other components as may be desirable.

We have found that aluminum pigments are suitable for use in this invention, although it is envisioned that other pigments such as carbon black may, of course; be used. A preferred aluminum pigment is the Lansford 243 aluminum paste available through Silberline Manufacturing Co., Inc. of Lansford, Pa. Typical characteristics of this pigment include a flake size of 99% minimum through 325 mesh (wet method screen analysis), a non-volatile content of about 65% minimum by weight and 35.3% minimum by volume, and a specific gravity of about 1.48. It is provided in a solvent comprising a mixture of mineral spirits and high aromatic compounds. Another suitable pigment is the Silberline Eternabrite 651-1, having a flake size of 99.9% through 325 mesh, a non-volatile content of 72% minimum by weight and 40.5% by volume, and a specific gravity of 1.60. The aluminum pigments can be provided in a concentration of about 0.5 to 1.0 percent by weight of the total coating composition.

It may also be desirable to include known dispersants or suspension aids where long term storage is anticipated.

It is our present belief that the particular combination of a copper or rare earth carboxylate compound in combination with a zinc carboxylate compound, further in combination with the over-based sulfonate, organic solvent, and the additional components of this invention, provides the exceptional corrosion resistance, adhesion, application properties, and curing exhibited by this invention. We have also found that the combination of three metal driers, namely, a copper carboxylate compound, a zinc carboxylate compound, and a rare earth carboxylate compound, in the context of this invention, will provide exceptional and suprisingly effective corrosion prevention.

PREPARATION OF THE COMPOSITION

As previously described, a preferred corrosion-inhibiting composition of this invention consists essentially of about 20–40% over-based calcium sulfonate, about 10–20% tung oil, about 30–60% organic solvent, about 3–8% petrolatum, about 0.1 to 0.6% copper in the form of copper carboxylate compounds, about 0.2 to 1.1% zinc in the form of zinc carboxylate compounds, and about 0.5–3% polyisobutylene.

To prepare the coating composition of this invention, the oxidized petrolatum is preferably heated to its melting point, about 130° F., for ease of addition. The petroleum may be melted in any suitable container such as a beaker, a drum, or the like. Heating elements may be used, or the container may be placed in a hot room. Other methods of heating can, of course, be used if desired. Other components, such as Saci 200A sulfonate, can also be pre-heated before addition to the mixing vessel to facilitate the mixing of components.

To the mineral spirits, with constant mixing, is added the calcium overbased sulfonate, followed by the melted or pre-heated oxidized petrolatum. These components should be thoroughly mixed, usually for about 10 minutes, for example with a motor driven propeller mixer.

The mixture is then allowed to cool to between 70° to 80° F. If desired, a cooling water bath, a cooling jacket, or the like may be used. When the mixture has reached a temperature of about 70° to 80° F., the remaining components are slowly added, with thorough mixing between the addition of each component. A suggested but not critical order of addition of the remaining ingredients would be the drying oil, the individual metal driers, and the polyisobutylene.

In another suggested method of preparing the composition, the calcium overbased sulfonate (at either room temperature or pre-heated) may be added to the room temperature mineral spirits. These components may be mixed together until uniform, and then heated to about 140° F. When the mixture reaches 140° F., the pre-heated oxidized petroleum may be added, and these components mixed together until uniform. The mixture may then be allowed to cool and the remaining ingredients added, as described previously.

After all of the components have been added, it is recommended that composition be mixed for an additional period of time to insure thorough mixing. Preferably, the composition is mixed for an additional 10–30 minutes.

During the addition of components and mixing, care should be taken to avoid the entrapment of air into the mixture. At the suggested temperature, the viscosity of the mixture is such that entrapped air bubbles are unlikely to rise to the surface and escape.

Where pigments, suspension aids, or other non-volatile components are also utilized, they may be added at any point, but preferably while the mixture is hot, for each addition.

The composition can be stored in appropriate sealed containers, under ambient conditions.

METHOD OF PREVENTION CORROSION

The method according to the present invention comprises forming a coating of from about 1–10 mils thick on the surface to be protected, the coating being of the composition previously described, and allowing the coating to cure. Frequently, the coating thickness will be about 3–6 mils. Multiple layers of 1–10 mils in thickness can be successively applied and cured, particularly where it is desirable to form a coating of greater than 10 mils. The coating can be formed by any suitable application method such as brushing, rolling, immersion of the surface to be coated, spraying, or the like. Generally, where necessary, the composition of this invention will flow sufficiently to provide a smooth and uniform coating even when applied by brush, roller, or the like.

For immersion coating, the surface to be coated is simply dipped into the composition and then removed. The thickness of the coating applied in this way will, of course, vary depending upon the viscosity of the coating composition. However, we have found that a coating of about 8 mils will often form on an immersion coated metal surface with a temperature of about 75° F., while a coating of about 5 to 6 mils will often form on a metal surface with a temperature of about 120° F.

For reasons of cost effectiveness, spraying is the preferred method of application. Generally, spray coating can be accomplished using less of the coating composition. Suitable spraying techniques are well known in the art.

Several external factors affect the curing of the coating composition of this invention. These factors include the presence of oxygen or air (greater air circulation generally contributes to faster curing); the presence of moisture in the air (less moisture generally contributes to faster curing); the temperature (higher temperatures generally contribute to faster curing); and the coating thickness (a thinner coating generally tends to cure faster). Sometimes these factors affect one another. We have found that a 3 mil coating will typically cure, under most conditions, within about 24 hours. Thicker coatings will require more curing time up to, for example, 48 hours, or under more rigorous conditions, up to 72 hours.

It is preferred that any loose rust or other substances which would limit adhesion be physically or chemically removed from a surface prior to coating. Power or manual wire brushing is preferred. It is not necessary to remove the tightly bonded rust which will very often be found on a metal surface. However, use of a degreaser such as a solvent emulsifying compound is recommended where there is any oily contamination.

The following specific Examples, which include the best mode, were prepared and tested as described.

EXAMPLE I

Into a 250 ml. beaker was charged 44 grams of mineral spirits obtained from Texaco, under the trademark TexSolv S-66. The beaker was placed on a hot plate and mineral spirits were slowly heated to a temperature of 140° F. During the heating process, to the beaker was added 31 grams of a calcium overbased sulfonate, trademarked SACI 200A, obtained from Witco Chemical, New York. A propeller mixer was inserted into the beaker and the overbased sulfonate and mineral spirits were mixed to a uniform dispersion, during the heating process.

Four and one half grams of oxidized petrolatum, trademarked ALOX 600 obtained from the Alox Corporation, were slowly heated to 140° F., and the petrolatum was slowly added with mixing to the 140° F. mineral spirits and overbased sulfonate. Mixing continued for 2 additional minutes.

The beaker was then removed from the hot plate and the contents allowed to cool to 80° F. on the bench. The following components were then added to the beaker, with mixing, in the following order: 13.5 grams tung oil (obtained from Welch, Holme & Clark Co., Inc.), 2.5 grams 12% copper metal drier (12% copper CEM-ALL, Mooney Chemicals), 2.5 grams 22% zinc metal drier (22% zinc HEX-CEM), and 2.0 grams PARA-TAC (trademark) polyisobutylene.

Mixing continued for an additional 10 minutes after all components had been added.

The resulting composition was then tested utilizing the salt fog or salt-spray test as set forth in ASTM B117-73. The salt fog or salt spray test is considered to be considerably more severe than other tests such as the static immersion test or the agitated immersion test.

To conduct the salt fog test, a metal panel (mild steel ASTM A366, sandblasted) measuring 2"×1/16" was coated with a 3 mil thickness of the composition by dipping the panel into a beaker containing the composition. The coating on the panel was allowed to cure under ambient conditions (75° F., 30% humidity). Within 24 hours, the coating had cured to a hard film which was dry to the touch.

The panel was placed in a salt-fog chamber, in a rack, leaning slightly back from a vertical position. The panel was supported at 2 points at its bottom edge and 1 point at its middle backside. The salt-fog chamber was operated at about 95° F., at 100% humidity, with a 5% NaCl mist or fog.

The coated panel was observed every day for signs of corrosion, by visual inspection of the panel left undisturbed in the rack.

After 4,344 hours (181 days), the first trace of corrosion appeared. After 4,632 hours (193 days), about 10% of the panel surface exhibited light corrosion. After 4,752 hours (198 days), 50% of the panel surface was corroded.

Throughout the testing, the coating remained hard and adhered well to the metal.

EXAMPLE II

Into a 30-gallon steam-jacketed stainless steel mixing kettle was charged 99 pounds of mineral spirits obtained from Texaco. Steam was then applied to begin heating. As heating occurred, an air-powered propeller mixer was utilized to agitate the kettle contents as 69.75 pounds of SACI 200A sulfonate (Witco Chemical) were added.

With continued mixing, the mixture was allowed to reach a temperature of 150° F. At this temperature, the steam was removed and 10.1 pounds of ALOX 600 petrolatum (pre-heated to 140° F.) was added, with mixing. After 2 minutes of mixing, cooling water was introduced to the jacket to cool the kettle contents. Mixing continued throughout this time. After the mixture had reached a temperature below 80° F. the remaining components were added, with continued mixing, in the following order: 30.4 pounds tung oil, 5.6 pounds 12% copper CEM-ALL, 5.6 pounds 22% zinc HEX-CEM, 4.5 pounds PARATAC polyisobutylene. Mixing continued for an additional 15 minutes after all components were added.

A panel was coated and allowed to cure as in Example I. The coating composition cured within 24 hours.

The coated panel was tested as in Example I, utilizing the salt-fog test. The first trace of corrosion appeared after 7 months, or approximately 5,000 hours. After 5,240 hours (218 days), about 10% of the panel surface exhibited light corrosion. After 5,336 hours (222 days) about 50% of the panel surface exhibited corrosion.

EXAMPLE III

A coating composition was prepared as in Example I except 37 grams mineral spirits were used instead of 44 grams; 35 grams SACI 200A were used instead of 31 grams; 5 grams ALOX 600 were used instead of 4.5 grams; 15 grams tung oil were used instead of 13.5 grams; 3 grams 12% copper CEM-ALL were used instead of 2.5 grams; 3 grams 22% zinc HEX-CEM were used instead of 2.5 grams.

A panel was coated with this composition and cured as in Example I except coating thickness was 4 mils. The coating cured within 24 hours.

The composition was tested as in Example I utilizing the salt-fog test. After 840 hours (35 days), a small corrosion stain appeared on the top edge of the panel. Roughly one month later, this small stain was still the only visible corrosion.

After 2,304 hours (96 days), about 10% of the panel surface exhibited light corrosion. After 2,784 hours (116 days), 50% of the panel surface exhibited corrosion.

The foregoing Examples and discussion provides the detailed discussion of the invention. However, since many embodiments of the invention can be made without departing from the spirit and scope of the invention, the invention resides in the claims hereinafter appended.

I claim:

1. A corrosion-inhibiting composition which comprises:
   (a) about 5 to 80% by weight of a rust-inhibitive, grease-like concentrate comprising a thioxotropic inorganic/organic complex stably dispersed in an essentially inert liquid oily phase in an amount not to exceed 4 parts, per part of said complex, of said essentially inert liquid oily phase, said inorganic-/organic complex comprising an over-based alkaline earth organic sulfonate salt, whereby the crystalline structure of the inorganic portion of said complex is platelet and film-forming in character;
   (b) about 1 to 25% by weight of at least one drying oil, said drying oil being miscible in a diluent oil selected from the group consisting of aliphatic hydrocarbon diluents, cycloaliphatic hydrocarbon diluents, aromatic hydrocarbon diluents, and mixtures thereof, boiling at temperatures above 150° C.;
   (c) about 0.03 to 0.6% by weight metal provided by a first metal drier selected from the group consisting of copper carboxylate compounds, rare earth carboxylate compounds, and mixtures thereof;
   (d) about 0.1 to 2.2% by weight metal provided by a second metal drier selected from the group consisting of zinc carboxylate compounds;
   (e) about 10 to 90% by weight organic solvent; and
   (f) about 2 to 15% petrolatum.

2. The composition of claim 1 which further comprises up to 5% by weight polyisobutylene.

3. The composition of claim 1 wherein the first metal drier comprises a copper carboxylate compound, and the composition further comprises a third metal drier comprising a rare earth carboxylate compound providing a rare earth metal concentration of about 0.06 to 0.3% by weight of the composition.

4. The composition of claim 3 wherein the third metal drier comprises a lanthanum or cerium carboxylate compound.

5. The corrosion-inhibiting composition of claim 1 wherein the first metal drier consists essentially of neutralized copper organic acid compounds.

6. The corrosion-inhibiting composition of claim 5 wherein the second metal drier consists essentially of neutralized zinc organic acid compounds.

7. The corrosion-inhibiting composition of claim 6 wherein the drying oil comprises tung oil.

8. The corrosion-inhibiting composition of claim 7 wherein the over-based alkaline earth organic sulfonate salt comprises an over-based calcium sulfonate compound.

9. A corrosion-inhibiting composition which consists essentially of about 20 to 40% over-based calcium sulfonate, about 10 to 20% tung oil, about 30 to 60% organic solvent, about 3 to 8% petrolatum, about 0.1 to 0.6% copper provided by copper carboxylate compounds, and about 0.2 to 1.1% zinc provided by zinc carboxylate compounds.

10. A corrosion-inhibiting composition which consists essentially of about 20 to 40% over-based calcium sulfonate, about 10 to 20% tung oil, about 30 to 60% organic solvent, about 3 to 8% petrolatum, about 0.1 to 0.6% copper provided by copper carboxylate compounds, about 0.2 to 1.1% zinc provided by zinc carboxylate compounds, and up to about 5% polyisobutylene.

11. A corrosion-inhibiting composition which consists essentially of about 20 to 40% over-based calcium sulfonate, about 10 to 20% tung oil, about 30 to 60% organic solvent, about 3 to 8% petrolatum, about 0.1 to 0.6% copper provided by copper carboxylate compounds, about 0.2 to 1.1% zinc provided by zinc carboxylate compounds, and about 0.06 to 0.3% rare earth metals provided by rare earth carboxylate compounds.

12. A corrosion-inhibiting composition which consists essentially of about 20 to 40% over-based calcium sulfonate, about 10 to 20% tung oil, about 30 to 60% organic solvent, about 3 to 8% petrolatum, about 0.1 to 0.6% copper provided by copper carboxylate compounds, about 0.2 to 1.1% zinc provided by zinc carboxylate compounds, about 0.06 to 0.3% rare earth metals provided by rare earth carboxylate compounds, and up to about 5% polyisobutylene.

* * * * *

UNITED STATES PATENT AND TRADEMARK OFFICE
CERTIFICATE OF CORRECTION

PATENT NO. : 4,749,412

DATED : June 7, 1988

INVENTOR(S) : Ciuba et al.

It is certified that error appears in the above-identified patent and that said Letters Patent is hereby corrected as shown below:

```
Column 4, Line 56, for "costillation" read --distillation--.
Column 5, Lines 50-51, for "neodeanoate" read --neodecanoate--.
Column 5, Line 68, for "weiht" read --weight--.
Column 6, Line 36, for "A-I" read --A-1--.
Column 8, Lines 8-9, for "petroleum" read --petrolatum--.
Column 8, Line 57, for "PREVENTION" read --PREVENTING--.
Column 10, Line 11, for "2" x 1/16"" read --2" x 4" x 1/16"--.
```

Signed and Sealed this

Eighth Day of November, 1988

*Attest:*

DONALD J. QUIGG

*Attesting Officer*  *Commissioner of Patents and Trademarks*